US005608748A

United States Patent [19]
Reimer et al.

[11] Patent Number: 5,608,748
[45] Date of Patent: Mar. 4, 1997

[54] COOLING DEVICE FOR A PULSED LASER AND PROCESS FOR THE OPERATION OF SUCH A COOLING DEVICE

[75] Inventors: Peter Reimer, Ellwangen; Heinz Abramowsky, Giengen; Roland Brenner, Wallhausen, all of Germany

[73] Assignee: Carl Zeiss Stiftung, Heidenheim, Germany

[21] Appl. No.: 547,077

[22] Filed: Oct. 18, 1995

[30] Foreign Application Priority Data

Oct. 20, 1994 [DE] Germany ......................... 44 37 489.5

[51] Int. Cl.⁶ .................................................. H01S 3/04
[52] U.S. Cl. .................................................. 372/35; 372/34
[58] Field of Search .......................... 372/34, 35; 376/144

[56] References Cited

U.S. PATENT DOCUMENTS 3,569,860  3/1971  Booth ....................................... 372/35
4,759,894  7/1988  McCorkle ............................... 376/144

FOREIGN PATENT DOCUMENTS 1255402  12/1971  United Kingdom .

OTHER PUBLICATIONS

08490742 Jun. 15, 1995, Carl Zeiss, Assignee filed Jun. 15, 1990.

Primary Examiner—Rodney B. Bovernick
Assistant Examiner—Luong-Quyen T. Phan

[57] ABSTRACT

A cooling device for a pulsed laser includes a cooling circuit with a cooling medium whose volume is increased in the pulsed excitation process. At least one inlet valve and at least one outlet valve are provided in the cooling circuit, and are dimensioned in dependence on the operating parameters of the laser such that at least a partial circulation of the cooling medium takes place in the cooling circuit due solely to the increase of the cooling medium volume in the excitation process, Separate pumps for the circulation of the cooling medium are dispensed with,

13 Claims, 1 Drawing Sheet

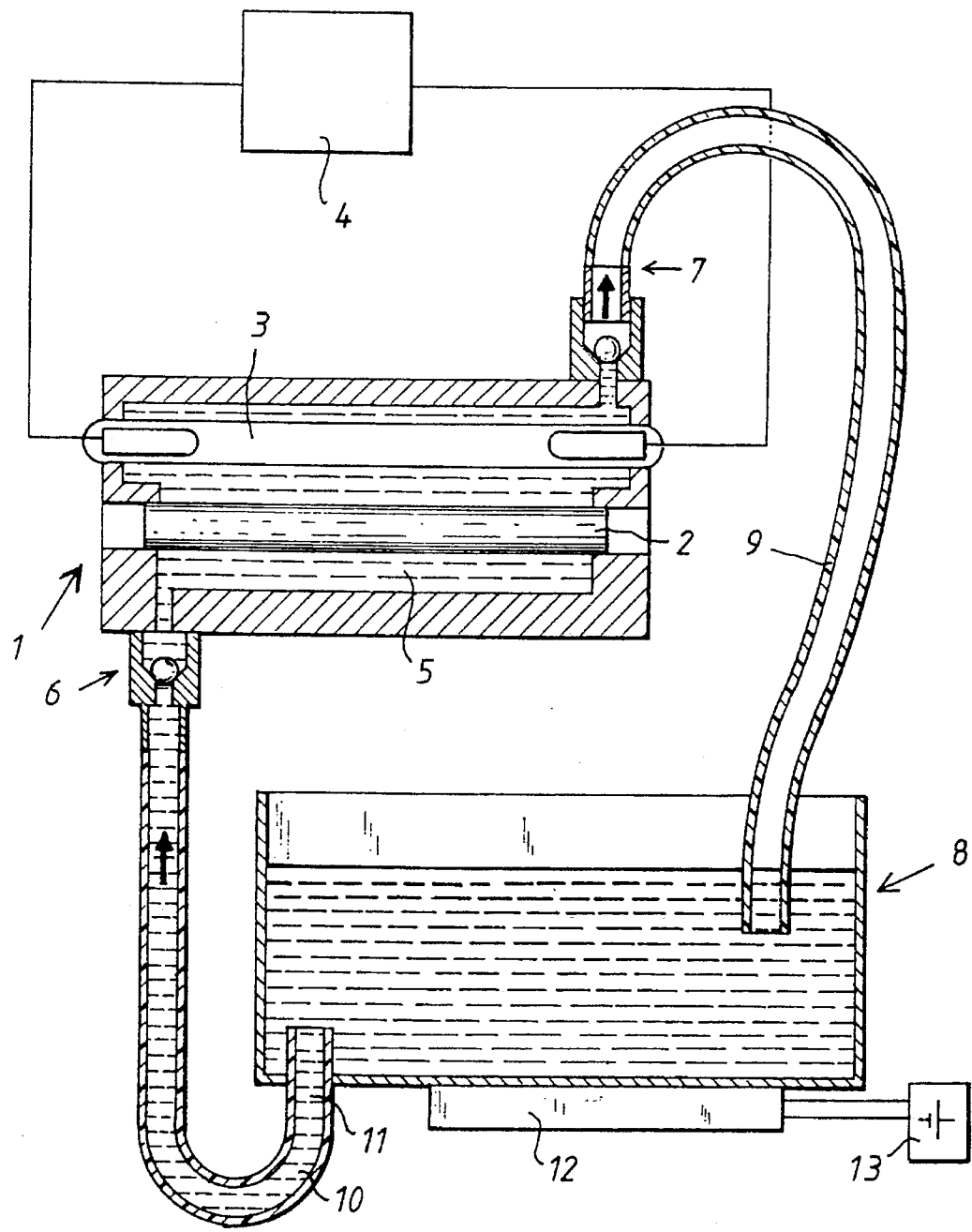
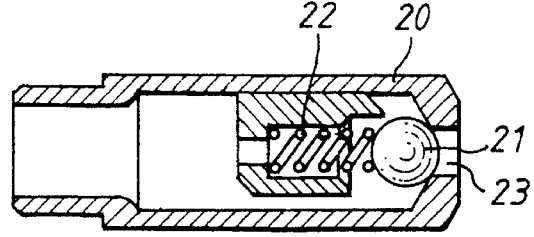

COOLING DEVICE FOR A PULSED LASER AND PROCESS FOR THE OPERATION OF SUCH A COOLING DEVICE

BACKGROUND OF THE INVENTION

1. Field of the Invention

The present invention relates to a cooling device for a pulsed laser having at least one cooling circuit with a cooling medium whose volume increases due to pulsed excitation.

The present invention also relates to a process for the cooling of a pulsed laser that has at least one cooling circuit, wherein the volume of the cooling medium in the cooling circuit increases in a pulsed excitation process.

2. Discussion of Prior Art

In known solid-state lasers, one or more laser rods, inclusive of flash lamps for the pulsed excitation of the laser medium, are usually arranged in a corresponding cavity or cavity housing. Various cooling devices that prevent a thermal overloading of the laser medium within such solid-state lasers are known.

For example, a suitable cooling liquid or a suitable cooling medium can be conducted directly through the cavity and can flow around the flash lamp(s) and the laser medium.

Furthermore, arrangements are known in which the cooling liquid is conducted in cooling tubes of helical shape around the rod-shaped laser medium and/or the flash lamp(s).

All the known arrangements have in common the feature that usually one or more pumps are provided in the cooling circuit, and effect a circulation of the respective cooling medium, and thus a corresponding withdrawal of heat.

However, problems now result for certain laser applications, when expensive cooling devices of this kind are necessary for a solid-state laser. In the case of a compact solid-state laser arranged directly on a surgical microscope, the required inflow and outflow ducts of the cooling medium circuit, including the necessary pump and the supply ducting, are considerably disturbing for the operating surgeon.

SUMMARY OF THE INVENTION

The object of the present invention is therefore to provide as inexpensive as possible a cooling device, for a compactly constructed, preferably pulsed, laser, in order to ensure efficient cooling of the laser in spite of a low cost. A further object of the present invention is to provide a process for operation of such a cooling device.

The expense of the required cooling is considerably reduced in that, according to the present invention, separate pumps for the circulation of the cooling medium in the cooling circuit are completely dispensed with. According to the invention, the circulation of the cooling medium is attained by the use of the excess pressure which transitorily arises in the pulsed excitation process, that is, preferably on firing of the flash lamps, due to the resulting heating in the cooling medium. By a corresponding dimensioning of the inlet and outlet valves in the cooling circuit, it is ensured that with each pumping pulse a given fraction of the cooling medium is circulated and can afterwards cool down until the cooling medium finally reaches this region of the cooling circuit again.

A simple circulation of the cooling medium is ensured in this manner for all pumping yields or pumping frequencies which are not excessively high. The cost which would otherwise be required for pumps in the cooling circuit, etc., can thus be immensely reduced.

Moreover, a marked reduction in the production costs of such a cooling device, or of the complete laser, of course also results because of the omission of the otherwise usual pumps.

A particularly efficient cooling is in addition ensured when there is provided in the cooling circuit at least one supply container into which the circulated cooling medium is conducted and is there passively and/or actively cooled before it again reaches the laser cavity or the vicinity of the laser medium to be cooled.

BRIEF DESCRIPTION OF THE DRAWING

Further advantages and details of the cooling device according to the invention and also of the process according to the invention will be set forth in the description herein below of a preferred embodiment of the cooling device, with reference to the accompanying Figures, in which:

FIG. 1: shows a schematized representation of the principles of the cooling device according to the invention in connection with a known solid-state laser;

FIG. 2: shows a representation of a suitable inlet valve or outlet valve within the cooling device.

DETAILED DESCRIPTION OF PREFERRED EMBODIMENT

FIG. 1 shows a schematized representation of the principles of a preferred embodiment of the cooling device according to the invention.

In a cavity (1) or the corresponding cavity housing, a rod-shaped laser medium (2) and a flash lamp (3) are arranged adjacently. The cavity (1) has an elliptical cross section, the rod-shaped laser medium (2) and the flash lamp (3) being preferably arranged at the foci of the ellipse. Moreover, the inner side of the cavity is designed to be reflective for the pumping wavelength, that is, the flash lamp radiation, in order to secure as efficient as possible an excitation of the laser medium (2).

In the embodiment shown, an Er-doped YAG rod is provided as the laser medium (2), and provides a laser wavelength of 2.94 µm. Other known solid-state laser materials, such as Nd:YAG, etc., can also be used in connection with the cooling device according to the invention.

Likewise alternative cavity arrangements, with a different cavity cross section and with several flash amps, and so on, can always be used in connection with the cooling device.

In the embodiment shown, a linear flash lamp with the type designation OXF 393 of the Q-ARC Company is provided as the flash lamp (3) for the optical pumping of the rod-shaped laser medium (2).

The pumping pulse frequency of the flash lamp (3) is controlled in a defined manner by means of a suitable control module (4), that is, the flash lamp is fired at the desired frequency by means of the control module. The pulsed flash lamp operation is effected in a known manner by means of a capacitor discharge, which is switched by means of thyristors, transistors, or IGBTs.

in the embodiment shown, the flash lamp (3) attains a pumping energy of 40 J. The repetition rate is about 1 Hz, that is, a pulsed excitation of the laser medium (2) takes place at a relatively low frequency.

The pulse frequency thereby supplied by the laser is completely sufficient for certain medical applications in ophthalmology or in ear, nose and throat surgery.

The cavity or the cavity housing (1) is filled with the cooling medium (5) of the cooling circuit. Ordinary water is usually used as the cooling medium (5); as an alternative to this, however, the use of deionized water and of other suitable cooling media (5) is also possible at any time.

The cooling circuit moreover includes, besides the cooling medium (5) proper, inlet and outlet valves (6, 7), which are arranged in the cavity housing (1).

The valve (6) on the underside of the cavity is designed as the inlet valve, while the valve (7) arranged on the upper side of the cavity functions as the outlet valve for the liquid cooling medium (5) from the cavity housing (1).

If the flash lamp (3) is fired to excite the laser medium (2), a transitory expansion of the cooling medium (5) in the cooling circuit takes place within the cavity housing (1). The inlet and outlet valves (6, 7) are dimensioned in terms of the possible throughput and also the force required to open them, such that this transitory increase in volume of the cooling medium (5) is used to the effect that at least a portion of the cooling medium (5) leaves the cavity housing (1) through the outlet valve (7) in the pumping pulse interval. The inlet valve (6) opens directly after the pumping pulse, because of the reduced pressure arising in the cavity (1) due to the subsequent cooling of the cooling medium, and a corresponding volume fraction of the cooling medium in the remainder of the cooling circuit flows into the cavity (1) again, and so on. Thus, a circulation of the cooling medium (5) within the cooling circuit is effected in this manner without separate pumps.

A supply container (8) is provided in the cooling circuit proper of the cooling device. The cooling medium (5) which leaves the cavity (1) via a corresponding outflow duct (9) during the pumping pulse goes into this supply container (8). An inflow duct (10) is connected via an outlet opening (11) of the supply container (8) to the inlet valve (6), which connects the supply container to the cavity housing (1).

Moreover, the supply container (8) in the cooling circuit is in thermal contact with an active cooling element (12), designed as a known Peltier element. The cooling element (12) is kept at a desired temperature by means of a corresponding control element (13). The cooling element (12) accordingly acts to provide an additional active cooling down of the temperature of the cooling medium (5) in the supply container (8).

According to the expenditure desired for the cooling circuit, the cooling element (12) can alternatively be designed as a passive cooling element, and can consist solely of a correspondingly large surface over which heat exchange can take place between the supply container (8) and the surroundings.

A combination of active and passive cooling elements in connection with the supply container is possible within the cooling device according to the invention.

Moreover, the cooling device according to the invention can likewise be designed without a supply container when a small heat output is to be removed. Analogously, it is also possible to arrange more than one such supply container in the cooling circuit, etc.

Consequently, for dimensioning the cooling circuit, there only has to be determined in advance how much heat output will have to be removed by means of the cooling circuit from the surroundings of the laser medium (2) in order to ensure satisfactory laser operation.

The rod-shaped laser medium (2), which can be cooled with the cooling device shown has a length of about 55 mm and a diameter of about 4 mm. The pumping pulse duration produced by the flash lamp is about 400 μsec.

A circulation of the cooling medium (5) of the order of 0.1 ml per pumping pulse can then be effected when so-called ball check valves are used as the inlet and outlet valves (6, 7). For pump pulse frequencies which are not excessively high, such a circulation volume is completely sufficient for cooling the laser medium (2).

The inlet and outlet valves (6, 7) are designed, as already stated, as ball check valves in the embodiment shown. A corresponding embodiment of such a valve is shown in detail in FIG. 2.

Here a ball (21) is provided within a cylindrical cartridge (20), and is pressed by a spring (22) supported on the cartridge against a circular opening (23) in the floor of the cartridge. The cylindrical cartridge (20) is preferably made of corrosion-resistant special steel. Other materials, which are preferably chemically inert, can be used as alternatives. Matching of the inlet and outlet properties of the valves to the operating parameters of the laser can take place, for example, by a suitable choice of the size of the opening (23). Likewise, the setting of the spring pressure acting on the ball (21) has to be considered in matching the cooling circuit to the operating parameters of the laser. The opening properties of the valves can be adjusted in a defined manner by means of the effective spring force. Ball check valves that are suitable for this purpose are produced by Lee Hydraulic Miniaturkomponenten GmbH and are sold in a corresponding assortment.

Alternative possibilities of embodiment of the required inlet and outlet valves are also possible in this case.

The cooling device shown is suitable preferably for a compactly constructed laser of low power. Such a laser can be arranged, in an adapter, directly on a surgical microscope and can, for example, be used in ear, nose and throat surgery. A suitable adapter is described in the Applicant's assignee's U.S. patent application 08/490,742, filed on Jun. 15, 1995.

There is advantageously present in the cooling circuit, in addition to the liquid cooling medium proper, a small proportion of a gaseous cooling medium, wherein the gaseous cooling medium has a higher thermal expansion coefficient. Since the gaseous cooling medium therefore expands more than the liquid cooling medium when the flash lamp is fired, the overall result is an increased throughput, or an increased circulation volume, of the cooling medium in the cooling circuit.

Besides the embodiment of the cooling device according to the invention shown in FIG. 1, it is moreover always possible not to conduct the cooling medium directly through the cavity housing, but to provide tubular cooling ducts. These cooling tubes can in this case helically surround one or more flash lamps and the laser medium. In such an embodiment, the use of a single such cooling tube is just as possible as the use of several cooling tubes and correspondingly dimensioned cooling circuits. Inlet and outlet valves are provided in the individual cooling tubes, and operate in the same manner as the valves that were previously described.

The cooling device according to the invention can thus be used in numerous cavity arrangements of various kinds, and is not at all limited to the embodiment which has been described.

We claim:

1. A cooling device for a pulsed laser, comprising:

at least one cooling circuit with a cooling medium whose volume increases due to pulsed excitations, and at least one inlet valve and at least one outlet valve in said cooling circuit, said inlet valve and said outlet valve having properties in dependence on operating properties of said pulsed laser such that at least a partial circulation of said cooling circuit medium takes place in said cooling circuit due solely to an increase in volume of said cooling medium due to pulsed excitation.

2. Cooling device according to claim 1, further comprising at least one supply container for said cooling medium in said cooling circuit.

3. Cooling device according to claim 2, further comprising an active cooling element in thermal contact with said supply container.

4. Cooling device according to claim 2, further comprising a passive cooling element in thermal contact with said supply container.

5. Cooling device according to claim 1, further comprising at least one flash lamp and at least one rod-shaped laser medium arranged in a cavity, for pulsed excitation.

6. Cooling device according to claim 1, wherein said inlet and outlet valves are ball check valves.

7. Cooling device according to claim 1, wherein said cooling medium comprises a liquid cooling medium and a gaseous cooling medium in a predetermined volume proportion to said liquid cooling medium.

8. Solid state laser having a laser medium which is excited by pulsed excitations, comprising:

at least one cooling circuit with a cooling medium whose volume increases due to pulsed excitations, and at least one inlet valve and at least one outlet valve in said cooling circuit, said inlet valve and said outlet valve having properties in dependence on operating properties of said pulsed laser such that at least a partial circulation of said cooling circuit medium takes place in said cooling circuit due solely to an increase in volume of said cooling medium due to pulsed excitation.

9. A solid state laser according to claim 8, wherein said solid state laser comprises at least one Er:YAG rod as a laser medium.

10. Process for cooling a pulsed laser, which has a cooling device with at least one cooling circuit with a cooling medium, comprising:

employing a cooling medium whose volume increases in a pulsed excitation process, and at least partially circulating said cooling medium in said cooling circuit due solely to an increase of volume of said cooling medium volume in said excitation process.

11. Process according to claim 10, further comprising circulating said cooling medium through a supply container in said cooling circuit.

12. Process according to claim 10, further comprising cooling said cooling medium actively in said supply container.

13. Process according to claim 10, further comprising cooling said cooling medium passively in said supply container.

* * * * *